UNITED STATES PATENT OFFICE.

ADOLFO POUCHAIN, OF TURIN, ITALY.

NEGATIVE PLATE FOR ELECTRIC BATTERIES.

1,399,996.   Specification of Letters Patent.   Patented Dec. 13, 1921.

No Drawing. Original application filed September 18, 1919, Serial No. 324,657. Divided and this application filed February 11, 1920. Serial No. 357,897.

*To all whom it may concern:*

Be it known that I, ADOLFO POUCHAIN, a subject of the King of Italy, and resident of Turin, Italy, have invented certain new and useful Improvements in Negative Plates for Electric Batteries, of which the following is a specification.

This invention relates to negative plates of zinc for electric batteries and has for its object a negative plate which may be used in an electrolyte consisting of water acidified with sulfuric acid without the said plate being liable to consumption when the circuit is open.

The consumption of the metal which is characteristic of the known batteries of this type is essentially due to the fact that the zinc used for making the negative plates always contains impurities (lead, iron, copper or the like) which have a polarity the opposite to that of zinc and therefore give rise to local couples, the effect of which is to cause the zinc to dissolve in the sulfuric acid. On the other hand, the impurities which the commercial sulfuric acid always contains in sensible proportions (for example copper sulfate) deposit on the zinc even when the latter is pure and also give rise to gradual consumption of the plate.

In the plates according to this invention said inconveniences are avoided by the fact that said plates are treated as hereinafter described so as to exclude the formation of local couples and are coated with a suitable porous covering for protecting them against the deleterious action of an impure electrolyte. The treatment itself forms no part of the present invention, however, but constitutes the subject of my prior application, No. 324,657, filed September 18, 1919, of which this case is a division.

The first result is realized by submitting the zinc plates to a treatment the effect of which, as may be supposed, is to cover the metal and more particularly the particles of its impurities, with a very thin layer of hydrogen, while the second result is realized by covering the plate with paper, preferably greased, and kept adherent to the plate by coating the latter with a fatty substance.

The plates according to this invention may be of any form or shape and thickness and may be obtained by the hereinafter described process.

The plates are first amalgamated by any known method and then are placed in a bath of water slightly acidified with sulfuric acid and containing about 10 per cent. of a solution of magnesium sulfate and mercuric sulfate; thereafter the plates are caused to act as a cathode and a current of about 2 amperes per square decimeter is passed.

It may be useful to add to said bath a small proportion of ammonium sulfate.

After the described treatment, which occupies about an hour, the plates are dried at a gentle heat.

The plates thus obtained are absolutely unattackable, when the circuit is open, by distilled water acidified with pure sulfuric acid so that by using such zinc plates as negative electrodes in a battery operated with sulfuric acid there is no loss of zinc while the circuit is open if the sulfuric acid is pure.

Finally to avoid loss due to the action on the zinc of the impurities ordinarily contained in sulfuric acid, the plate is wrapped in a sheet of paper suitably greased to protect it from the action of the acid and made to adhere to the plate itself with aid of a substance which is both adhesive and fatty.

In such a manner without sensibly increasing the internal resistance of the battery, the plate is also protected against the injurious action of the impurities of sulfuric acid, and the batteries formed with the aid of plates according to this invention, even when they yield a high voltage when the circuit is closed, have no loss of zinc when the circuit is open, so that the battery has a much greater durability than those ordinarily used.

As the immunizing action of the aforesaid treatment does not extend much below a superficial layer of the zinc, it is preferable to use a plate having a large number of perforations, which may be very small, in order to augment the immunized surface and limit the extension of the erosion when this has occurred.

What I claim as my invention and desire to secure by United States Letters Patent is:

1. A negative electrode for electric batteries consisting of a zinc plate wrapped in a sheet of greased paper which is kept adherent to said plate by a layer of a fatty substance.

2. A negative electrode for electric batteries consisting of an amalgamated zinc plate wrapped in a sheet of greased paper which is kept adherent to said plate by a layer of a fatty substance.

Signed at Turin, Italy, this Jan. 21, 1920.

ADOLFO POUCHAIN.